Dec. 13, 1955     H. F. NIED     2,726,908
PUMP, INCLUDING PACKING
Filed Feb. 2, 1955
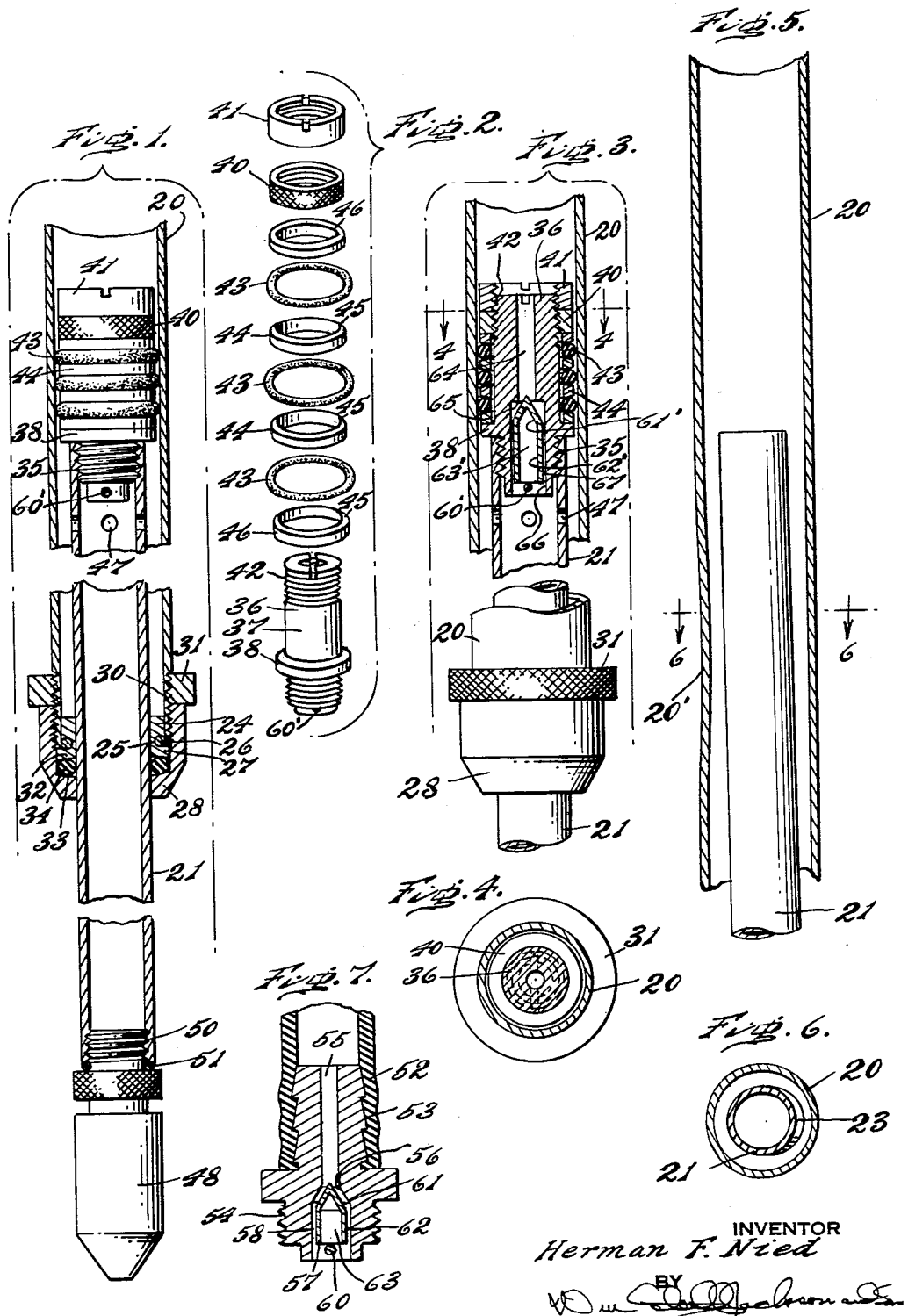
INVENTOR
*Herman F. Nied*
BY
ATTORNEYS.

United States Patent Office 2,726,908
Patented Dec. 13, 1955

2,726,908

PUMP, INCLUDING PACKING

Herman F. Nied, Oaklyn, N. J.

Application February 2, 1955, Serial No. 485,745

3 Claims. (Cl. 309—23)

The present invention relates to pumps, particularly of the agricultural type pump, and especially to packing including piston packing, and valves suitable for such pumps and for other packing and valve applications.

A purpose of the invention is to permit the sealing between an outer tubular member and an inner member moving with respect thereto, especially an inner member reciprocating with respect thereto, notwithstanding non-uniformity in the relative dimensions and shapes of the cooperating members.

A further purpose is to permit the use of commercial standard tubing for reciprocating pumps.

A further purpose is to frictionally seal between an outer tubular member and an inner relatively moving member by a stack of stiff laterally movable spacers alternating with O-rings, the spacers exerting wedge action radially on the O-rings, and floating radially due to looseness of internal fit, desirably having a range of total freedom of between 2 and 6 percent of the outside diameter of the packing holder.

A further purpose is to reduce the frictional strain on guide bushings which guide the piston rod by minimizing chafing action during the reciprocating cycle.

A further purpose is to provide uniform frictional drag on the piston rod throughout the pressure stroke notwithstanding variations in the contour of the respective inner and outer pump members.

A further purpose is to produce a check valve for a pump or the like which will have relatively little gravity effect and will operate in a wide variety of different positions without the need for a spring.

A further purpose is to employ a check valve having a hollow interior and desirably consisting of a conical end portion and a tubular body or skirt, the conical end portion being directed toward the seat.

Further purposes appear in the specification and in the claims.

In the drawings I have chosen to illustrate one only of the numerous embodiments in which my invention may appear, selecting the form shown from the standpoints of convenience in illustration, satisfactory operation and clear demonstration of the principles involved.

Figure 1 is a fragmentary axial section of a pump of the invention illustrating the forward end and the piston type packing.

Figure 2 is an exploded perspective of the packing elements which form the piston packing.

Figure 3 is a fragmentary axial section showing the piston with packing and showing the outlet valve.

Figure 4 is a transverse section through the piston and outlet valve assembly on the line 4—4 of Figure 3.

Figure 5 is a fragmentary axial section showing in exaggerated form non-uniformity in the tubing.

Figure 6 is a section on the line 6—6 of Figure 5.

Figure 7 is a fragmentary axial section of the inlet and of the pump showing the inlet valve.

Describing in illustration but not in limitation and referring to the drawings:

While certain aspects of the invention are applicable to packings generally including packings of the piston type, and to valves generally, the invention is believed to find its widest application in an agricultural pump, of the character which is extensively used for spraying insecticides, weed killers, liquid fertilizers, growth assisting agents, and similar materials from a bucket, tank, or similar container. Pumps of the type in question may likewise be used for spraying coatings of the character of whitewash and paint, and for small scale fire pumps and bilge pumps.

In the manufacture of agricultural pumps and the like, it has been necessary in the past to use very high grade tubing, either specially manufactured or specially selected, or to especially bore the tubing, in order to obtain satisfactory sealing over an extended service life.

One of the important aspects of the invention is that run-of-mill commercial tubing can be used with good results on sealing, notwithstanding that various non-uniformities exist in the tubing itself. Thus, for example, the tubing will in many cases be slightly eccentric or egg-shape. There is also variation in diameter from point to point along the tubing. The direction of the major axis of the eccentricity varies angularly at positions along the bore of the tubing. Also in many cases the axis is not truly straight so that if tubes are telescoped, the axis of one of the tubes will not be perfectly in line with the axis of the other tube. Various combinations of these defects will exist from tube to tube.

Figures 5 and 6 show in exaggerated form a supposed condition. Here it will be noted that the outer tube 20 is markedly eccentric at 20', forming what appears to be a dent, and the axis of the inner tube 21 is not perfectly in line with the axis of the outer tube 20, as best seen in Figure 6, where the wall of the inner tube is much closer to the wall of the outer tube on the side 23 than at any other circumferential position at the particular point on the length.

It will be understood, of course, that Figures 5 and 6 are intended to exaggerate the condition, but the general condition shown, in a much less exaggerated form, exists generally in run-of-mill commercial seamless tubing, and present a serious problem for a sliding piston of fixed diameter from the standpoint of sealing by packing.

Any solid packing used on the piston will quickly be worn out and fail to seal against the cylinder wall when interposed between two tubes which bear the relationship of those shown in Figures 5 and 6. Furthermore, any such solid packing when so used will cause excessive chafing against the guide bushings and packing nut resulting in elongated holes and leakage. Furthermore, the frictional drag which provides opposition against the motion of the piston will vary markedly throughout the pressure stroke under the conditions contemplated in Figures 5 and 6.

Accordingly in the manufacture of agricultural pumps and the like, in order to produce a product of high quality, it has been necessary to take special precautions to assure that the tubing will be axially straight, concentric and free from variations in the wall thickness and the internal diameter. This can be accomplished either by selection of tubing, adding to the cost, or by buying tubing of relatively thick wall and machining to correct non-uniformity in shape.

I have discovered that by a special design of packing, a long-lived, efficient seal can be accomplished between ordinary run-of-mill tubing, without imposing serious frictional drag on the operating members. I accomplish this by using a stack of O-rings alternating with stiff wedge rings, and radially floating so that shift in position can be accomplished readily to compensate for differences in diameter, lack of axial straightness, eccentricity and shift in the direction of the eccentric axis.

By the present invention, the chafing previously referred to against the guide bushings and the packing nut is avoided, and uniformity of frictional drag by the packing throughout the pressure stroke is assured.

A further difficulty which has existed in agricultural pumps is also corrected by the present invention. Whereas an ordinary pump usually is operated continuously in the same position, an agricultural pump is shifted to various angular positions and frequently is directed downwardly during operation. At other times as when spraying fruit trees it is likely to be directed horizontally or upwardly.

The change in position of the pump during operation and the operation in different angular positions causes serious difficulty in valve design. Spring closed check valves are open to the difficulty that many chemicals are likely to be used in the pump, some of these being very corrosive to springs, and others tending to form deposits which clog or otherwise interfere with spring action. When balls are used without springs, difficulty is encountered because the gravity effect on the balls tends to make the valves close when they are not intended to close and remain open when they are intended to close.

I find that this difficulty can be largely overcome by employing a valve which is hollow and open to the liquid stream on the downstream side (with the valve open) so that the hydraulic effect of liquid entering the hollow portion of the valve will tend to assist in closing when the valve should close, and the effect of the stream will tend to hold the valve open when it should open, thus avoiding any need for a spring notwithstanding various operating positions.

Considering now the pump as shown in Figures 1 to 4 and 7, I provide an outer tube or pump cylinder 20 and an inner tube or pump piston rod 21. At the outlet end the inner tube is sealed by a packing retainer 24 fitting in the end of the pump cylinder and having an annular outwardly directed slot 25 which receives an elastomer O-ring 26 of rubber or the like and an annular outer flange 27 beyond the slot which extends out into engagement with the interior of a packing gland 28 threaded on the end of the cylinder at 30 and held by a lock nut 31. The end of the packing retainer remote from the cylinder has a wedge contour 32 and the opposed surface of the packing gland has a wedge contour 33, which tend to force elastomer O-ring 34 into sealing engagement around the piston rod 21, thus sealing against leakage where the piston rod extends beyond the pump.

At the inner end the piston rod 21 is internally threaded at 35 to receive a similarly threaded packing holder 36. The packing holder has a cylindrical exterior surface 37 extending in an axial direction, and defined at one end by a shoulder 38 and at the other end by a packing nut 40 and lock nut 41 threaded on the threads 42 on the end of the packing holder.

The packing space on the piston holder is occupied by a series or stack of elastomer O-rings 43 made of rubber or the like interposed by stiff spacers or rings 44.

The O-rings are suitably made of any elastomer, typical examples being rubber, and synthetic rubber such as neoprene, Buna S and Buna N. The cross section of the elastomer rings when free from restraint is desirably circular and the rings when free from restraint desirably fit tightly on the outside of the packing holder.

The stiff rings 44 which are alternating with the elastomer rings in the stack are suitably of metal and float in the sense that they are substantially larger interiorly than the outside of the packing holder, and substantially smaller than the inside of the pump cylinder 20 so that they are free to assume eccentric positions radially to meet the requirements as the relative shape of the inside of the pump cylinder changes or misalignment occurs between the axis of the pump cylinder and the axis of the piston rod 21. Good results have been obtained with a clearance over-all internally between the stiff rings or spacers and the cylindrical outer surface of the packing holder of between 2 and 6 percent and preferably about 3.5 percent of the outside diameter of the packing holder at 37, although it will of course be understood that good results would be obtained using a wider range of freedom, especially on the high side. The external over-all clearance between the spacers and the cylinder should be at least as great as the internal clearance between the spacers and the packing holder.

The spacers on their opposed axially directed sides converge radially outwardly forming conical or wedge-shaped surfaces 45 which engage the sides of the O-rings and tend to force the O-rings radially outwardly when the stack is tightened.

At the end of the stack adjoining the shoulder and adjoining the packing nut there is a special stiff spacer 46 which has a flat surface on one side and a conical surface 45 only on the surface adjoining the packing.

The number of O-rings in the stack will vary, but for good results should be at least two and for best results three or more.

The piston-packing combination is tightened so that the O-rings are in engagement with the inside of the pump cylinder but there is freedom for shift or distortion radially to take care of variations in axial alignment and eccentricity and wall thickness during reciprocation. Since the piston has a labyrinth effect, it is not necessary to tighten to the extent which would be required if a single O-ring were used, and it is desirable to leave the piston rings quite free to deflect radially toward one side or the other as required. One of the great virtues of the invention is that different O-rings can shift differently as changes in contour of the bore occur during the reciprocating cycle and thereby release any abnormal friction on the guide bushings 24 and 28. The stiff spacers between the O-rings need not be and often will not be at exactly the same position.

The piston rod 21 serves as a discharge or outlet pipe, and for this purpose it is provided with holes 47 extending into the interior. A spray nozzle 48 is secured to the discharge end of the piston rod by threads 50 and sealed by an elastomer O-ring 51.

Inlet to the pump from a bucket or other suitable container is accomplished by a hose 52 connected to a hose fitting 53 which is threaded at 54 into the end of the pump cylinder 20. A bore 55 extends through the fitting 53 to a conical seat 56 which communicates with the interior of the pump chamber. A check valve 57 occupies a cylindrical space 58 beyond the seat 56 and is limited in motion away from the seat by a pin 60. The check valve has at the end toward the seat a conical seating face 61 and extending downstream therefrom (with the valve open) a tubular body or skirt 62. The space inside the conical portion and the body or skirt is hollow at 63 so that the check valve is exceedingly light and the gravitational effect on the check valve due to bodily shift in position of the pump will not be serious. On the suction stroke the flow of liquid around the conical end will readily unseat the check valve and hold it open, so that liquid can enter the pump chamber. The liquid flow tends to hold the valve open due to the fluid force on the conical surface. On the other hand, as soon as the pressure stroke begins, liquid entering the hollow skirt and the hollow portion of the cone end quickly forces the valve closed. It is thus not necessary to use a spring.

The liquid passes through the pump, and inside the piston head enters port 64 and encounters outlet valve seat 65. Beyond the outlet valve seat there is a cylindrical chamber 66 in which is placed a valve element 67 similar to the inlet valve element and having a conical portion 61' cooperating with the seat, a tubular body or skirt 62' extending downstream (with the valve open), and hollow interior 63' inside the skirt and inside the conical end. A pin 60' limits the motion of the outlet valve away from the seat.

In operation, after the pump is assembled, and the piston packing is adjusted properly so as to obtain a satisfactory seal on the interior of the valve chamber, the pump is ready for operation. The user holds the cylinder in one hand and holds the piston rod in the other hand and moves the two relatively back and forth. With the inlet hose placed in a bucket of water or suitable spray solution, on the suction stroke the outlet valve closes, under the action of the fluid entering its hollow interior, and the inlet valve opens under the force of the fluid on its cone end, filling the cylinder as the cylinder volume increases. On the discharge stroke, the inlet valve is closed due to the action of the fluid on the hollow interior and the outlet valve is opened due to fluid action on the cone surface at the outside, forcing liquid out the nozzle for spray purposes.

As the piston moves back and forth, the packing shifts radially to compensate for differences in relative contour of the cylinder and the piston rod.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention, what I claim as new and desire to secure by Letters Patent is:

1. In a packing for sealing between an outer tubular member and an inner relatively moving member, an externally cylindrical packing holder on the inner member, a plurality of stiff spacers loosely surrounding the packing holder, a plurality of elastomer O-rings surrounding the packing holder and alternating with the stiff spacers endwise of the packing holder, the stiff spacers converging outwardly on the sides engaging the O-rings, and means for compressing the stack of spacers and O-rings longitudinally, the O-rings in the compressed stack protruding out radially beyond the spacers under wedge action of the spacers and the O-rings engaging and sealing on the inside of the outer tubular member.

2. A packing according to claim 1, in which the stiff spacers which are interposed between the O-rings have conical side faces engaging the O-rings.

3. A packing according to claim 1, in which the clearance at the inside between each of the stiff spacers and the outside diameter of the packing holder is between 2 and 6 percent of the outside diameter of the packing holder.

References Cited in the file of this patent

UNITED STATES PATENTS

| | | |
|---|---|---|
| 1,147,343 | Smolensky | July 20, 1915 |
| 1,493,410 | Wolcott | May 6, 1924 |
| 1,662,725 | Toney | Mar. 13, 1928 |
| 2,060,847 | Bowen | Nov. 17, 1936 |
| 2,479,554 | Bugg | Aug. 23, 1949 |
| 2,501,984 | Alward | Mar. 28, 1950 |
| 2,570,406 | Troshkin et al. | Oct. 9, 1951 |
| 2,593,193 | Rockwell | Apr. 15, 1952 |

OTHER REFERENCES

Product Engineering, February 1945, 309–23, "Design of Hydraulic Systems" by Howard Field, Jr.